United States Patent Office 2,991,314
Patented July 4, 1961

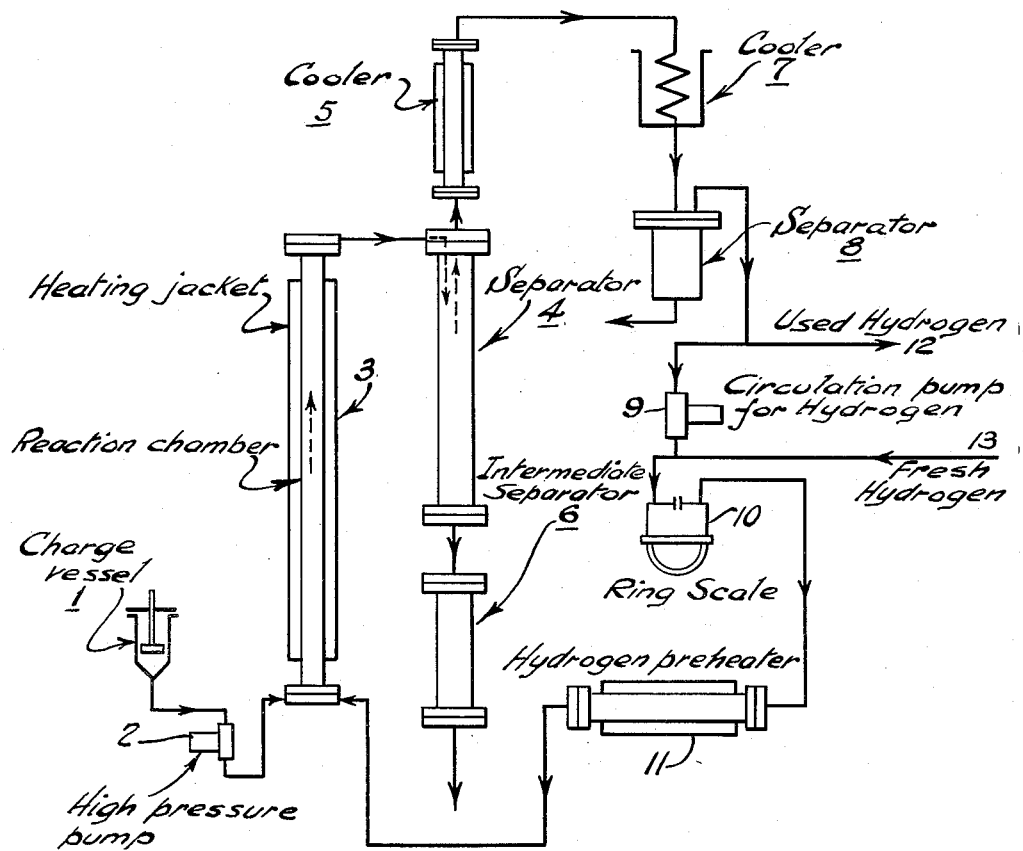

2,991,314
PROCESS FOR CLEAVAGE OF LIGNIN
TO PRODUCE PHENOLS
Johann Giesen, Haldenstein, near Chur, Switzerland, assignor to Inventa A.-G. für Forschung und Patentverwertung Luzern, Lucerne, Switzerland
Filed Oct. 7, 1954, Ser. No. 460,936
Claims priority, application Switzerland Oct. 20, 1953
1 Claim. (Cl. 260—627)

The present invention relates to the process of splitting or cleaving lignin to obtain useful products therefrom.

One object of the invention is to split lignin by a new and improved process which will produce a comparatively high yield of distillable products.

Another object of the invention is to split lignin by a new and improved process which will produce a comparatively high yield of distillable products and which can be practically employed without the use of catalysts.

A further object of the invention is to split lignin by a new and improved process which will produce a comparatively high yield of distillable products and which can be successfully carried out with lignins of different types, and especially with the so-called "Scholler lignin."

The cleavage of lignin by hydration with hydrogen at high pressures and temperatures and with or without catalysts has been hitherto proposed. In practically all processes heretofore known, the hydration of lignin has been accomplished by a discontinuous process or batch and has been carried out in such a way that a batch of the material to be hydrated would be heated in the presence of an aqueous or organic medium and a catalyst in a shaking or stirring autoclave under hydrogen pressure. In this procedure, the heating of the contents of the autoclave to temperatures between 250° C. and 350° C. would in general be continued until the decline of the pressure to a constant value indicated the discontinuance of the absorption of hydrogen and therefore the completion of the reaction. For this purpose, heating periods of about five to eighteen hours and more were required. The detached portions of the lignin in the form of distillable products obtained according to this method of working, consisted, according to the particular conditions of reaction, chiefly of mixtures of nuclear hydrated substances of the type of cyclohexanol and of alkali soluble phenols of more or less high molecular nature. Moreover, there remained behind as distillation residues varying quantities of resinous brittle masses which contained a part of the lignin in highly condensed form and showed themselves to be no longer reactive under the chosen conditions of reaction.

From this fact, the conclusion is to be drawn that because of the long duration of heating, undesired condensation reactions occur in which initially formed phenolic detached portions of the lignin can also take part, so that the yield in distillable products is considerably lowered.

Furthermore, it ensues catalyst material amounting to 20–30 percent, and in some cases even up to 100 percent of the lignin used, had to be employed in order that serviceable yields might be obtained. Such an excessive use of catalysts, which are frequently very expensive, renders entirely illusory the practical execution of the proposed processes. In keeping with that, nothing has heretofore become known either about the further development of such processes based upon the discontinuance of cleavage of lignin or about the practical application of them.

In the description of English Patent No. 542,471 (application date September 7, 1940), the object of which is the discontinuous hydration of lignin in the presence of nickel, platinum, palladium or similar catalysts, it is mentioned in the patent that the treatment of lignin can be conducted also continuously in counter-current to hydrogen; however, no details are given respecting conditions of reaction, yields, etc.

It has been found in accordance with the present invention, that even without the use of catalysts, favorable results are secured if the cleavage is carried out with molecular hydrogen as distinguished from nascent hydrogen under high pressure (above 350 atmospheres) and at high temperatures not lower than 300° C. by a continuous process. In this procedure, the hydrogen together with the lignin made into a paste in a rubbing agent (dispersion vehicle) as for example by a mill are forced continuously through a reaction chamber in such a way, that the products of reaction that are formed and cooled off immediately after they leave the reaction chamber and are collected in a separator in which the hydrogen is separated from the liquid products. In comparison with the discontinuous or batch method of working, the continuous process has the great advantage that the course of reaction can be controlled in simple manner by controlling the rate of charge. By such control, the time during which the material undergoing reaction remains in the reaction chamber can be measured and set in such a way, that the cleavage of the lignin leads substantially only up to the production of the desired phenolic cleavage products.

Surprisingly enough, even after a comparatively short time, the decomposition of the lignin in the continuous process of the present invention is very extensive and from the total lignin split up, distillable products in good yield are obtained. The chemical nature of these distillable products depends substantially upon the time required for the reaction material to pass through the reaction chamber and accordingly upon the extent of conversion, and also upon the temperature and pressure in the reaction chamber.

As rubbing agent (dispersion vehicle) for lignin, use is desirably made of high boiling liquids of phenolic or non-phenolic nature that are able to dissolve the cleavage products forming from lignin. Xylenol is particularly useful for the purpose. Xylenol is under the conditions of reaction employed completely stable. Also advantageous for use as rubbing agents are the distillable products obtained in a preceding decomposition phase and having suitable boiling point.

The decomposition by the continuous method described can be accomplished with lignins of every kind, and particularly with the lignin of the technical wood saccharification process, for example with the so-called "Scholler lignin" obtained according to Scholler in the saccharification of wood with dilute sulphuric acid, or also with the lignin obtainable from the lye-wash of sulphate of cellulose manufacture. For the decomposition of Scholler lignin, it is advisable to neutralize the sulphuric acid contained in it by addition of caustic lime.

The process according to the invention is illustrated in the light of the following examples and of the drawing showing diagrammatically an apparatus for carrying out the process, but the broader aspects of the invention are not limited to them.

*Example 1*

A mixture having the following composition:

10.00 kg. of Scholler lignin (water content 4.0% =lignin of wood saccharification according to Scholler)
0.50 kg. of caustic lime
37.40 kg. of xylenol 47.90 kg. all together is ground into a thin pulp in a ball mill, delivered to a charge vessel 1 and forced continuously by means of a high pressure pump 2 into the lower inlet end of a vertically arranged reaction tube or chamber 3. The rate of feed from the pump 2 to the inlet end of the reaction chamber 3 is controlled to effect the necessary decomposition of lignin therein, without subjecting the products formed to subsequent reaction which will reduce the yield. At the same time with the feed of the paste, hydrogen circulated by a pump 9 and preheated in a preheater 11 to 300°–350° C. is delivered continuously to the bottom of the reaction chamber 3, to form with the paste delivered from the high pressure pump 2 a liquid and gas mixture under a pressure of 700 atmospheres. This liquid and gas mixture flows continuously upward in the reaction chamber 3, while the temperature in this reaction chamber is maintained at about 300° C. by an electric heating jacket. The reaction mixture and the free hydrogen not absorbed in the formation of the decomposition products emerge together at the upper end of the reaction chamber 3 and reach the upper end of a separator 4. The liquid portions of the mixture fall in the separator 4 while the gas is drawn off through a cooler 5 in which the readily volatile portions are condensed and caused to fall back into the separator 4. This cooling action takes place immediately after the reaction mixture leaves the reaction chamber 3. The liquid separated in the separator 4 is discharged into an intermediate receptacle 6 and the liquid products together with the calcium sulphate formed by the reaction of the sulphuric acid in the Scholler lignin with the caustic lime added to the initial charge mixture are drawn from the intermediate receptacle 6.

Any residual readily boiling portions not condensed in the cooler 5 are carried over to a super-cooler 7, condensed therein and discharged into a separator 8. A part of the hydrogen leaving the separator 8 is released at 12, and is replaced at 13 by fresh hydrogen which together with the unused hydrogen is turned back for recirculation through the system. The circulating quantity of hydrogen gas is continuously measured by a ring scale device 10.

The 47.90 kg. of mixture entered into the system is worked on in 29 hours. At a capacity of the reaction chamber 3 of 2.1 liters and a feed performance of the high pressure pump 2 of 1.65 kg./hr., the time during which the reaction mixture remains in the reaction chamber 3 comes to 1¼ hours.

The crude oil obtained by the process described from the receptacle 6 and the separator 8 constitutes a solution of the products of cleavage of the lignin in the added xylenol and in addition contains the formed calcium sulphate as a finely divided solid constituent. This solid constituent is separated from the oil in known manner by filtration or centrifugation and this oil is decomposed by distillation. The following distillates are obtained with practically perfect recovery of the added xylenol:

(1) Oil passing over through distillation at normal pressure between 60 and 180° C. of specific gravity 0.850: 0.326 kg.=3.4 percent of lignin.

(2) Oil passing over by distillation at 6 mm. Hg between 150 and 325° C., containing phenols: 4.20 kg.= 43.8 percent of lignin.

All together, therefore, 47.2 percent of lignin is obtained in distillable products without the use of catalysts. More than 40% of these distillable products are phenolic products. Besides this, there remains behind 2.07 kg. of a solid distillation residue, corresponding to 21.5 percent of lignin.

*Example 2*

A mixture of 7.57 kg. of Scholler lignin (water content 9.0 percent)
0.38 kg. of caustic lime
28.30 kg. of xylenol
―――――
36.25 kg. all together is processed and converted continuously in the arrangement described in Example 1 and shown in the drawing at 380° C. and 700 atmospheres of hydrogen pressure in 10 hours. Thus the quantity put in per hour is 3.63 kg., so that it takes any portion of the reaction mixture approximately 0.6 hour to pass through the reaction chamber 3.

The processing of the crude oil obtained is done analogously to Example 1 and yields besides the xylenol recovered the following products forming from the lignin:

(1) Oil passing over through distillation at normal pressure between 55 and 180° C. of specific gravity 0.85: 0.268 kg.=3.9 percent of the lignin.

(2) Oil passing over through distillation at 6 mm. Hg between 150 and 320°, containing phenols, 3.00 kg.= 43.6 percent of lignin.

Therefore, the yield in total distillable products without the use of catalysts amounts to 47.5 percent of the lignin employed (figured water-free). As in the case of Example 1, more than 40% of these distillable products are phenolic products. 1.91 kg.=27.8 percent of the lignin is not decomposed and remains behind as non-distillable residue.

While the invention has been described with particular reference to specific examples, it is to be understood that it is not to be limited thereto but is to be construed broadly and restricted solely by the scope of the appended claim.

What is claimed is:

The process of decomposing lignin into distillable products which comprises the steps of mixing the lignin and xylenol as a stable liquid vehicle of a high boiling point in a mill to form a thin paste, continuously feeding this paste under high pressure to the inlet end of a reaction chamber maintained at a temperature of above 300° C. and a pressure of about 700 atmospheres, while continuously delivering to the inlet end of the reaction chamber molecular hydrogen under pressure, whereby the mixture of paste and hydrogen passes continuously through said reaction of the paste through the reaction chamber to maintain the amount of tarry undistillable residue to an amount below 30% by weight of the treated lignin, separating the liquid portions from the gases after the reacted mixture is discharged from the outlet of the reaction chamber, and distilling the liquid portions to obtain the distillable lignin decomposition products therefrom.

References Cited in the file of this patent

UNITED STATES PATENTS

| | | |
|---|---|---|
| 1,251,954 | Bergius et al. | Jan. 1, 1918 |
| 1,838,547 | Haslam et al. | Dec. 29, 1931 |
| 2,082,885 | Harvey | June 8, 1937 |
| 2,146,655 | Sherrard et al. | Feb. 7, 1939 |
| 2,246,481 | Adkins et al. | June 17, 1941 |
| 2,405,450 | Salvesen et al. | Aug. 6, 1946 |
| 2,632,772 | Armstrong et al. | Mar. 24, 1953 |

OTHER REFERENCES

Ellis: "Catalytic Hydrogenation of Organic Substances" (1930), pages 524–5 (2 pages).

UNITED STATES PATENT OFFICE
CERTIFICATE OF CORRECTION

Patent No. 2,991,314

July 4, 1961

Johann Giesen

It is hereby certified that error appears in the above numbered patent requiring correction and that the said Letters Patent should read as corrected below.

Column 4, line 48, after "reaction", first occurrence, insert -- chamber and said paste and hydrogen are reacted, controlling the rate of passage --.

Signed and sealed this 14th day of November 1961.

(SEAL)
Attest:

ERNEST W. SWIDER
Attesting Officer

DAVID L. LADD
Commissioner of Patents
USCOMM-DC